(12) United States Patent
Rygiel

(10) Patent No.: US 7,477,448 B2
(45) Date of Patent: Jan. 13, 2009

(54) DEVICE AND METHOD FOR ADJUSTING TWO OBJECTIVE LENSES IN 4PI-SYSTEM

(75) Inventor: Reiner Rygiel, Altrip (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 361 days.

(21) Appl. No.: 10/597,069

(22) PCT Filed: Nov. 10, 2004

(86) PCT No.: PCT/DE2004/002482

§ 371 (c)(1),
(2), (4) Date: Jul. 10, 2006

(87) PCT Pub. No.: WO2005/069041

PCT Pub. Date: Jul. 28, 2005

(65) Prior Publication Data

US 2007/0153366 A1    Jul. 5, 2007

(30) Foreign Application Priority Data

Jan. 8, 2004    (DE) .................... 10 2004 001 441

(51) Int. Cl.
*G02B 21/00* (2006.01)
(52) U.S. Cl. .................................... 359/370
(58) Field of Classification Search ............. 359/368, 359/370, 379
See application file for complete search history.

(56) References Cited

U.S. PATENT DOCUMENTS

| | | | | |
|---|---|---|---|---|
| 5,386,112 A * | 1/1995 | Dixon | ................... | 250/234 |
| 5,671,085 A * | 9/1997 | Gustafsson et al. | ......... | 359/385 |
| 5,760,951 A * | 6/1998 | Dixon et al. | ................ | 359/385 |
| RE38,307 E | 11/2003 | Gustafsson et al. | | |
| 7,333,207 B2 * | 2/2008 | Bewersdorf et al. | ......... | 356/451 |
| 2001/0030803 A1 * | 10/2001 | Engelhardt et al. | .......... | 359/385 |
| 2002/0030886 A1 * | 3/2002 | Bewersdorf et al. | ......... | 359/387 |
| 2002/0105722 A1 * | 8/2002 | Bewersdorf et al. | ......... | 359/370 |
| 2002/0109913 A1 * | 8/2002 | Gugel et al. | ................ | 359/387 |
| 2004/0114225 A1 * | 6/2004 | Engelhardt et al. | .......... | 359/385 |
| 2004/0120034 A1 * | 6/2004 | Miyawaki et al. | ........... | 359/385 |
| 2005/0006597 A1 * | 1/2005 | Wolleschensky et al. | . | 250/458.1 |

(Continued)

FOREIGN PATENT DOCUMENTS

DE    199 14 049 A1    10/2000

OTHER PUBLICATIONS

Soini, J. T. et al., "Image formation and data acquisition in a stage scanning 4Pi confocal fluorescence microscope," Appl. Opt. 36, pp. 8929-8934 (1997).*

(Continued)

*Primary Examiner*—Alessandro Amari
*Assistant Examiner*—Mark Consilvio
(74) *Attorney, Agent, or Firm*—Darby & Darby

(57) ABSTRACT

A method for adjusting two objective lenses in a 4Pi system of a scanning microscope includes imaging a reference object in respective pupils of the objective lenses so as to form a respective Fourier image for each of the objective lenses from a respective image of the reference object. The respective Fourier images are brought into coincidence by moving at least one of the objective lenses relative to the other.

31 Claims, 2 Drawing Sheets

U.S. PATENT DOCUMENTS

2006/0109547 A1* 5/2006 Engelhardt ............... 359/385
2007/0052972 A1* 3/2007 Leimbach et al. ........... 356/511

OTHER PUBLICATIONS

Hell et al., "Properties of a 4Pi confocal fluorescence microscope," J. Opt. Soc. Am. A 9, pp. 2159-2159 -(1992).*

Nagorni et al., "Coherent use of opposing lenses for axial resolution increase. II. Power and limitation of nonlinear image restoration," J. Opt. Soc. Am. A 18, pp. 49-54 (2001).*

International Search Report for International Application No. PCT/DE2004/002482, date of mailing Apr. 21, 2005.

* cited by examiner

DEVICE AND METHOD FOR ADJUSTING TWO OBJECTIVE LENSES IN 4PI-SYSTEM

CROSS REFERENCE TO PRIOR APPLICATION

This is a U.S. national phase application under 35 U.S.C. §371 of International Patent Application No. PCT/DE2004/002482, filed Nov. 10, 2004, and claims benefit of German Patent Application No. 10 2004 001 441.8, filed Jan. 8, 2004 which is incorporated by reference herein. The International Application was published in German on Jul. 28, 2005 as WO 2005/069041 A1 under PCT Article 21(2).

The present invention relates to a method and device for adjusting the two objective lenses in a 4Pi system of a preferably confocal scanning microscope, in which at least one of the objective lenses is movable relative to the other objective lens.

BACKGROUND

In 4Pi applications, two objective lenses which are disposed opposite each other with respect to a focal plane and whose optical axes are orthogonal to the focal plane must always be aligned in such a way that their foci meet in exactly one point within the focal plane. High-quality and error-free images can only be produced if the two objective lenses are precisely positioned in this manner.

Presently, very few methods and devices of the type mentioned at the outset have been described. In the known methods, one of the two objective lenses is stationary while the other objective lens is manually moved in the x-, y- and z-directions. By convention, x and y refer to the plane orthogonal to the optical axis, and the z direction is defined to be in the direction of the optical axis. In the known methods, an optical path is coupled out of the 4Pi system, and the interferometric configuration of the 4Pi system is made use of. Specifically, the interferometric image is observed, and the movably disposed objective lens is moved in the x- and y-directions until a zero-order image appears.

The known method is problematic in many aspects. First of all, the procedure described can only be used to adjust the two objective lenses in the x- and y-directions, while the adjustment in the z-direction requires a completely different method. In practice, this means that a user has to switch between the two methods during adjustment, which results in a significant loss of time for the user. Another disadvantage is that the state in which the two objective lenses are precisely adjusted with respect to each other does not remain stable over a longer period of time because of drifts or vibrations. As a result of this, image acquisition is possible just as long as the completed adjustment is stable. In the event of a misalignment, the measurement procedure must be terminated, the two objective lenses must be precisely realigned with each other, and it is only then that the measurement can be continued. Not the least is it attributable to this complicated and time-consuming adjustment, which also requires a high level of knowledge and experience, that no real breakthrough has yet been achieved as far as a routine application of 4Pi microscopy is concerned.

SUMMARY OF THE INVENTION

It is an object of the present invention is, therefore, to provide a method and device of the above type for adjusting the two objective lenses in a 4Pi system, in a way which, on the one hand, allows easy adjustment by the user without any special knowledge and, on the other hand, provides stability of the 4Pi image acquisition over a long period of time.

The present invention provides method for adjusting the two objective lenses in a 4Pi system of a preferably confocal scanning microscope, in which at least one of the objective lenses is movable relative to the other objective lens. A reference object is imaged in the pupils of the objective lenses, a separate Fourier image is formed for each objective lens from the images of the reference object, and the two Fourier images of the reference object are brought into coincidence by moving at least one of the objective lenses relative to the other.

The present invention also provides a device for adjusting the two objective lenses in a 4Pi system of a preferably confocal scanning microscope, in which at least one of the objective lenses is movable relative to the other objective lens. An illumination device and optical incoupling means are provided for imaging a reference object in the pupils of the objective lenses, a separate Fourier image can be formed for each objective lens from the images of the reference object, and the two Fourier images of the reference object can be brought into coincidence by moving at least one of the objective lenses relative to the other.

In accordance with the present invention, first of all, it was realized that in 4Pi microscopy, the simplification of the adjustment of the objective lenses, in particular, is of crucial importance. This simplification is achieved according to the present invention by imaging a reference object in the pupils of the objective lenses, and by forming a separate Fourier image for each objective lens from the images of the reference object. The Fourier image provides an optically very clean instrument that allows the objective lenses to be precisely aligned with each other very simply by moving at least one of the objective lenses relative to the other until the two Fourier images of the reference object, which come from the two objective lenses, exactly coincide with each other. Furthermore, the high sensitivity achieved using the Fourier images allows the two objective lenses to remain precisely aligned with each other over a long period of time, so that the 4Pi image acquisition may be expected to remain stable over a very long time. Finally, another advantage over the known methods and devices is that the objective lenses can be adjusted both in the xy-plane and in the z-direction in substantially the same way. In the method of the present invention, it not even necessary to remove the sample, or to otherwise inconveniently interfere with the microscope itself.

Advantageously the reference object could have a two-dimensional structure, so that the Fourier image shows illumination distributions both along the x-axis and along the y-axis. To allow for efficient analysis of the Fourier images, and, in particular, in order to obtain the same illumination distribution along the x-axis and along the y-axis in the Fourier image, the reference object could take the form of a cross-shaped aperture.

In order to prevent the illumination beam path and the detection beam path of the 4Pi system, to the extent possible, from being interfered with, it is particularly advantageous for the reference object to be provided outside the 4Pi system.

The illumination device could be provided by a laser light source, which could in particular be an infrared laser light source. It has been shown that infrared illuminating light has almost no influence on microscope image acquisition.

In order to couple the light of the illumination device into the 4Pi optical path, a beam splitter cube and a lens could be provided. The use of a beam splitter cube, preferably a 50/50 beam splitter cube, makes it possible, first of all, that the light of the illumination device can easily be coupled into the 4Pi optical path and, secondly, that the light exiting the 4Pi optical path is not completely reflected back onto the reference object or the illumination device, but can be made available for the analysis of the Fourier images.

In order for the reference object to be imaged in the pupils of the objective lenses, the reference object is advantageously located directly on the beam splitter cube side facing the illumination device.

In a specific embodiment, the Fourier images are imaged by a lens onto a camera, preferably onto a CCD camera. The Fourier images of the reference object, which result from the two objective lenses, appear in the camera image in a form similar to two pairs of cross hairs, and can therefore be brought into coincidence with each other during an initial coarse adjustment in a particularly simple manner by moving at least one of the two objective lenses relative to the other objective lens.

For a subsequent high-precision fine adjustment, the coincidence of the two Fourier images could be monitored by photodiodes placed in the plane of the Fourier images. In order to allow for easy distinction between the illumination patterns extending horizontally (i.e., in the x-direction) and those extending vertically (i.e., in the y-direction) in the Fourier image, the photodiodes are advantageously disposed in the higher-order space of the Fourier images.

In a preferred embodiment, two photodiodes are disposed in accordance with the two-dimensional structure of the reference object in such a way that one photodiode detects the vertical patterns and the other photodiode detects the horizontal patterns of the Fourier images. Of course, it is also possible to provide more than two photodiodes.

In order to position the objective lenses in the xy-plane, at least one of the objective lenses is moved until a maximum intensity value is reached at each of the two photodiodes. In this case, it can be ensured that the Fourier images exactly coincide with each other, and that the foci of the two objective lenses meet in exactly one point within the focal plane. The objective lenses' xy-positions that correspond to the respective maximum intensity values of the two photodiodes could be stored in a non-volatile memory for later retrieval.

In order to adjust the objectives along the optical axis, i.e., in the z-direction, at least one of the objective lenses could be moved in the direction of the optical axis in such a way that the sum signal of the photodiodes reaches a maximum intensity value. The sum signal of the two photodiodes becomes maximum exactly when the Fourier images are sharply defined, that is, when the objective lenses are positioned relative to each other in the z-direction in such a way that their foci meet in exactly one point of the focal plane. The objective lenses' z-positions that correspond to the maximum of the sum signal of the two photodiodes could also be stored in a non-volatile memory.

In the event that the signal intensities of the photodiodes differ from the maximum values, which is equivalent to a misalignment of the objective lenses, which may be caused by drift or vibration, it would be possible to automatically interrupt the measurement. Prior to performing a measurement, limit values could be specified for the intolerable degree of deviation at which to stop the measurement. The interruption of the measurement could be indicated to the user by an audible and/or visual signal.

In a preferred embodiment, the objective lens is automatically readjusted when the signal intensities of the photodiodes deviate from the maximum value. To this end, in particular, the objective lens could be provided with piezoelectric actuators which are controllable as a function of the signal intensities of the photodiodes. It would also be possible for the piezoelectric actuators to be controlled as a function of evaluation data from image processing of the camera images.

The monitoring of the Fourier images and, possibly, the readjustment of the objective lens could be cyclically repeated at regular intervals during a measurement. The measurement could be interrupted for this purpose, but it would also be conceivable for the measurement to continue. In the latter case, it is especially advantageous to log the movements performed by the objective lens during a measurement. Based on the logged data, errors may be corrected during subsequent image processing, as the case may be.

BRIEF DESCRIPTION OF THE DRAWINGS

The teaching of the present invention can be advantageously embodied and refined in various ways. The present invention is elaborated upon below based on examplary embodiments with reference to the drawings.

In the drawings.

DETAILED DESCRIPTION

Figure 1:
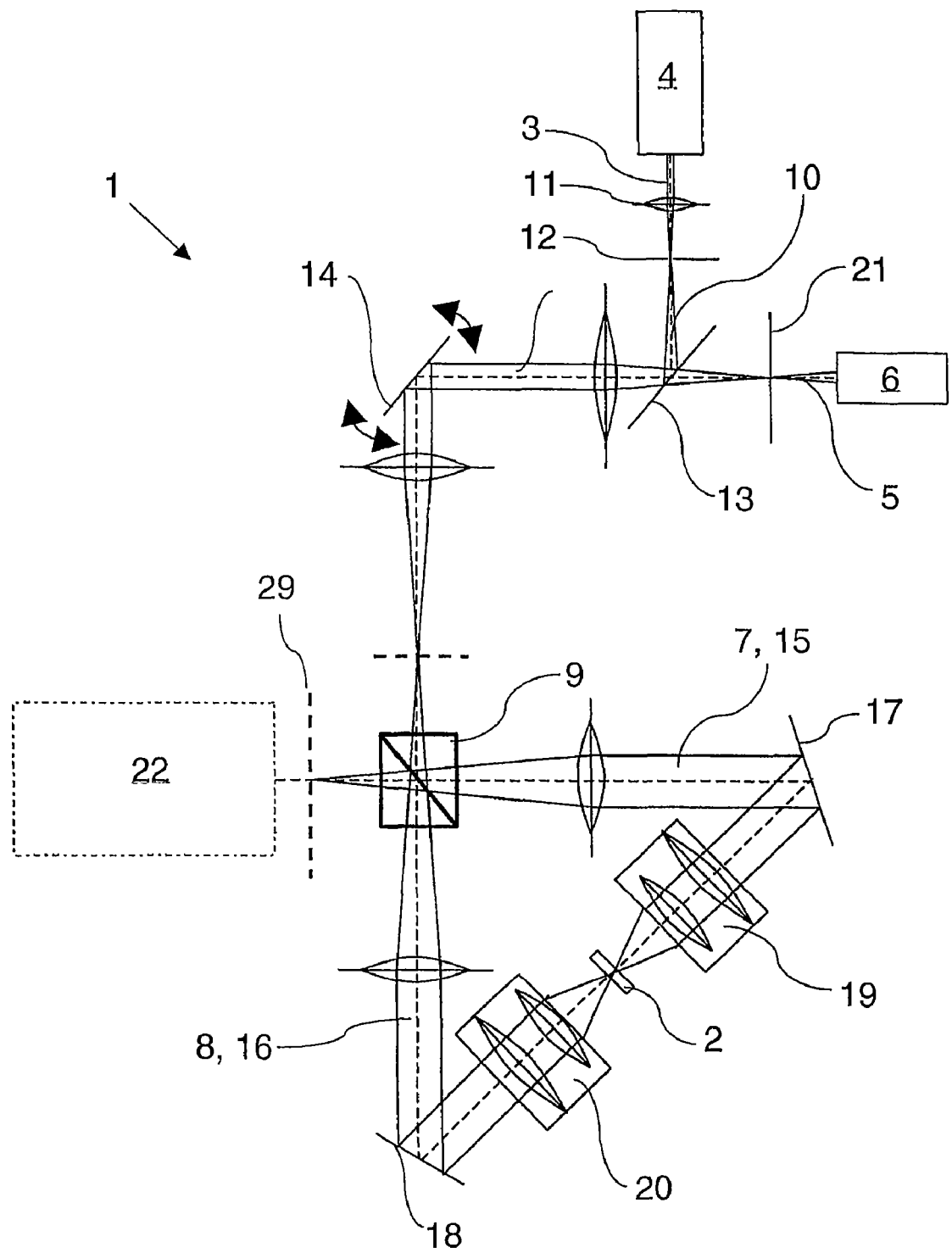
FIG. 1 is a schematic view of a 4Pi system and the coupling of a device according to the present invention for adjusting the two objective lenses of the 4Pi system.

FIG. 1 is a (schematic) view of a 4Pi system of a confocal scanning microscope 1 for examining a sample 2. Scanning microscope 1 includes an illumination beam path 3 of a laser light source 4, a detection beam path 5 of a detector 6, and a component 9 which splits illumination beam path 3 into two illumination beam sub-paths 7, 8 and combines detection beam path 5.

Illuminating light 10, which is provided by light source 4 and used for illuminating sample 2, is projected through a lens 11 onto excitation pinhole 12. The light passing through excitation pinhole 12 is reflected by a dichroic beam splitter 13 toward a beam deflection device 14. Beam deflection device 14 scans illuminating light beam 10 in two substantially perpendicular directions. The light beam reflected and scanned by beam deflection device 14 hits component 9, where it is split into two sub-beams 15, 16. The illuminating light traveling along the two sub-beams is reflected at mirrors 17, 18 and focused into the same point of sample 2 from both sides through microscope objectives 19, 20. sub-path The deflection of illuminating light beam 10 via beam deflection device 14 causes a change in position of the illumination foci of the two microscope objectives 19, 20, so that sample 2 can be illuminated two-dimensionally in the focal plane.

The detection light, for example, fluorescent, reflected, or transmitted light, emanating from object 2 (which is illustrated only schematically) is collected by the two microscope objectives 19, 20 and travels along illumination beam paths 7, 8 in the opposite direction. The detection light collected by microscope objective 19 (20) is reflected by mirror 17 (18) toward component 9 which combines detection beam path 5. When passing through component 9, the detection light is recombined and directed toward detection pinhole 21 via beam deflection device 14 and dichroic beam splitter 13. The detection light can pass through detection pinhole 21 only if it comes from the illumination focus of the two microscope objectives 19, 20, because, in accordance with the confocal principle, detection pinhole 21 is located in a plane that optically corresponds to the illumination focus of one of the two microscope objectives 19, 20. Similarly, excitation pinhole 12 is located in a plane that optically corresponds to the common illumination focus of the two microscope objectives 19, 20.

Figure 2:
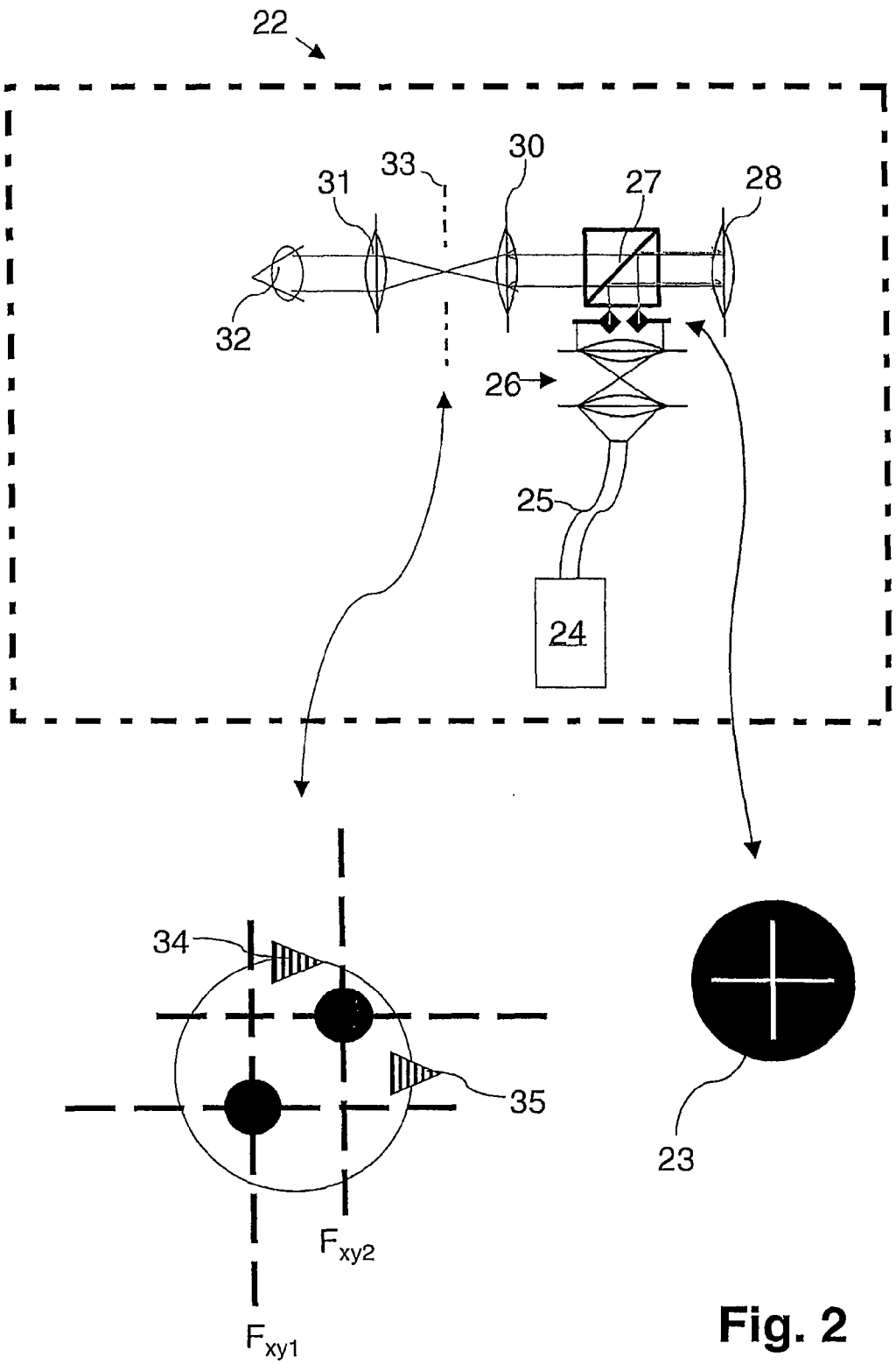
FIG. 2 schematically shows an exemplary embodiment of a device according to the present invention.

In order for the two microscope objectives 19, 20 to be precisely aligned such that the foci of the two microscope objectives 19, 20 meet in exactly one point in the focal plane, use is made of the device denoted by reference numeral 22, which is indicated only schematically in FIG. 1 and shown in greater detail in FIG. 2.

FIG. 2 schematically shows the specific configuration of an exemplary embodiment of a device according to the present invention for adjusting the two microscope objectives 19, 20 in a 4Pi system of a confocal scanning microscope 1. In accordance with the present invention, a cross-shaped aperture 23, which is shown enlarged in the bottom right portion of FIG. 2, is imaged in the pupils of microscope objectives 19, 20. To this end, the illuminating light of an infrared laser light source 24 is directed through an optical fiber 25 and onto a suitable lens system 26, such that cross-shaped aperture 23 is fully and evenly illuminated. Cross-shaped aperture 23 is located on a side of a 50/50 beam splitter cube 27 (BSC Pol Ir), said side facing illuminating light source 24. Via an imaging lens 28, the illuminating light is coupled into the 4Pi system at component 9, such that an intermediate image of cross-shaped aperture 23 is formed in plane 29, and that the cross-shaped aperture is imaged in the pupils of microscope objectives 19, 20. The light exiting the 4Pi system passes through beam splitter cube 27 and is projected through a lens 30 to form a two-dimensional Fourier transform of cross-shaped aperture 23. Due to the beam delivery system described above, a separate Fourier image of cross-shaped aperture 23 is obtained for each of the two microscope objectives 19, 20. An additional lens 31 is used to image the Fourier transforms onto a CCD camera 32.

The optical conditions in plane 33 of the Fourier transforms are shown in detail in the bottom left portion of FIG. 2. There are shown two Fourier images of cross-shaped aperture 23 which are offset from each other; the Fourier image denoted by Fxy1 resulting from the imaging of cross-shaped aperture 23 into the pupil of microscope objective 19, and the Fourier image denoted by Fxy2 resulting from microscope objective 20 accordingly. The situation illustrated in FIG. 2, where the two Fourier images in the form of cross hairs are offset from each other, suggests that the two microscope objectives 19, 20 are not precisely adjusted with respect to each other. For purposes of initial coarse adjustment of the two microscope objectives 19, 20, camera 32 is used in a first step for monitoring while the user brings the two Fourier images Fxy1 and Fxy2 into coincidence by moving objective lens 19 (in the present case, microscope objective 20 is stationary). Once the user has completed this procedure, he/she can start an automated process in a second step for fine adjustment, which will be described hereinafter:

In plane 33 of the Fourier transforms, two photodiodes 34, 35 are placed in the higher-order space. When microscope objectives 19, 20 are perfectly aligned with each other, i.e., when Fxy1 and Fxy2 are superimposed, the two photodiodes 34, 35 each indicate a maximum intensity value. Movable objective lens 19, which is capable of being positioned with high accuracy by piezoelectric actuators (not shown), can be iteratively moved in the x- and y-directions until a maximum value is reached at photodiodes 34, 35. In order to detect the direction of movement, objective lens 19 must either be moved beyond the maximum value, or objective lens 19 must be moved in both directions over a sufficient distance until a maximum value is reached. The maximum value is recorded in a non-volatile memory together with the associated position data of objective lens 19. In the event that microscope objectives 19, 20 become misaligned during the measurement, then the stored position data is retrieved from the memory, and corresponding corrective control commands are issued to the piezoelectric actuators. This process can be repeated cyclically.

In order to adjust microscope objectives 19, 20 along the optical axis, i.e., in the z-direction, it is possible to use the information from a sharply defined image of the Fourier images, that is, the sum signal of the two photodiodes 34, 35 is used. Here, use is made of the fact that the Fourier images become increasingly blurred as microscope objectives 19, 20 move away from their precisely adjusted z-positions. If objective lenses 19, 20 are excessively misaligned in the z-direction, then the Fourier images disappear completely. Consequently, a maximum sum signal is obtained when the two objective lenses 19, 20 are precisely adjusted. In order to detect the direction and maximum of the sum signal, the objective lens 19 is slightly moved in the positive and negative z-direction. Once the maximum of the sum signal is found, the associated z-position of objective lens 19 is also stored in a memory. After that, objective lens 19 is moved to the stored position, and then the adjustment of objective lens 19 in the z-direction is also complete. This process can be also repeated cyclically.

Finally, it is particularly emphasized that the exemplary embodiment discussed above is merely intended to illustrate the teaching claimed, but does not limit it to such exemplary embodiment.

What is claimed is:

1. A method for adjusting two objective lenses in a 4Pi system of a scanning microscope, the method comprising:
   imaging a reference object in respective pupils of the objective lenses so as to form a respective Fourier image for each of the objective lenses from a respective image of the reference object; and
   bringing the respective Fourier images into coincidence by moving at least one of the objective lenses relative to the other.

2. The method as recited in claim 1 wherein microscope is a confocal scanning microscope.

3. The method as recited in claim 1 further comprising recording the Fourier images by a camera.

4. The method as recited in claim 3 wherein the camera includes a CCD camera.

5. The method as recited in claim 3 further comprising monitoring the coincidence of the Fourier images using the recorded images.

6. The method as recited in claim 5 further comprising cyclically repeating the monitoring of the Fourier images at regular intervals during a measurement.

7. The method as recited in claim 3 further comprising analyzing the recorded images using image-processing software.

8. The method as recited in claim 1 further comprising monitoring the coincidence of the Fourier images respectively by a first and a second photodiode respectively disposed in respective planes of the Fourier images.

9. The method as recited in claim 8 further comprising moving at least one of the objective lenses in a plane orthogonal to an optical axis of the 4Pi system so as to achieve a respective maximum intensity value at each of the photodiodes.

10. The method as recited in claim 9 further comprising logging the moving performed during a measurement.

11. The method as recited in claim 9 further comprising storing respective xy-positions of the objective lenses in the plane, the respective xy-positions corresponding to the respective maximum intensity values of the photodiodes.

12. The method as recited in claim 8 further comprising moving at least one of the objective lenses in a direction of an optical axis of the 4Pi system so as to achieve a maximum intensity value in a sum signal of the photodiodes.

13. The method as recited in claim 12 further comprising storing respective z-positions of the objective lenses in the direction of the optical axis, the respective z-positions corresponding to the maximum intensity value of the sum signal of the photodiodes.

14. The method as recited in claim 8 further comprising automatically interrupting a measurement when respective signal intensities of the photodiodes deviate from respective maximum values.

15. The method as recited in claim 8 further comprising automatically readjusting at least one of the objective lenses when respective signal intensities of the photodiodes deviate from respective maximum values.

16. The method as recited in claim 15 further comprising cyclically repeating the automatic readjusting at regular intervals during a measurement.

17. An apparatus for adjusting two objective lenses in a 4Pi system of a scanning microscope, the device comprising:
  an illumination device and an optical incoupling device configured to image a reference object in respective pupils of the objective lenses so as to form a respective Fourier image for each of the objective lenses from a respective image of the reference object; and
  a lens moving device configured to move at least one of the objective lenses relative to the other so as to bring the respective Fourier images into coincidence.

18. The apparatus as recited in claim 17 further comprising an excitation pinhole disposed in an illumination beam path so as to enable the scanning microscope to provide confocal scanning microscopy.

19. The apparatus as recited in claim 17 wherein the reference object has a two-dimensional structure.

20. The apparatus as recited in claim 17 wherein the reference object has a form of a cross-shaped aperture.

21. The apparatus as recited in claim 17 wherein the reference object is provided outside the 4Pi system.

22. The apparatus as recited in claim 17 wherein the illumination device includes a laser light source.

23. The apparatus as recited in claim 17 wherein the optical incoupling device includes a beam splitter cube and a first lens.

24. The apparatus as recited in claim 17 wherein the reference object is disposed directly on a side of the beam splitter cube facing the illumination device.

25. The apparatus as recited in claim 17 further comprising a second lens configured to image the respective Fourier images onto a camera.

26. The apparatus as recited in claim 25 wherein the camera includes a CCD camera.

27. The apparatus as recited in claim 17 further comprising first and second photodiodes respectively disposed in respective planes of the Fourier images.

28. The apparatus as recited in claim 27 wherein the photodiodes are respectively disposed in respective higher-order spaces of the respective Fourier images.

29. The apparatus as recited in claim 28 wherein the photodiodes are disposed in accordance with a two-dimensional structure of the reference object so as to enable the first photodiode to detect respective vertical patterns and the second photodiode to detect respective horizontal patterns of the respective Fourier images.

30. The apparatus as recited in claim 17 wherein the lens moving device includes at least one piezoelectric actuator.

31. The apparatus as recited in claim 30 further comprising first and second photodiodes respectively disposed in respective planes of the Fourier images, and wherein the at least one piezoelectric actuator is controllable as a function of at least one of respective signal intensities of the photodiodes and evaluation data from image-processing software.

* * * * *